United States Patent
Scicchitano et al.

(10) Patent No.: US 6,579,835 B2
(45) Date of Patent: Jun. 17, 2003

(54) POLYURETHANES HAVING A LOW FRICTION COEFFICIENT

(75) Inventors: Massimo Scicchitano, Milan (IT); Tania Trombetta, Milan (IT); Stefano Turri, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/875,980

(22) Filed: Jun. 8, 2001

(65) Prior Publication Data

US 2002/0016267 A1 Feb. 7, 2002

(30) Foreign Application Priority Data

Jun. 8, 2000 (IT) .......................... MI00A1268

(51) Int. Cl.⁷ ..................... C10M 149/12; C08G 18/50
(52) U.S. Cl. ................... 508/446; 508/464; 521/155
(58) Field of Search .................. 508/446, 464

(56) References Cited

U.S. PATENT DOCUMENTS

| | | | |
|---|---|---|---|
| 2,242,218 A | 5/1941 | Auer | 427/316 |
| 3,242,218 A | 3/1966 | Miller | 568/615 |
| 3,665,041 A | 5/1972 | Sianesi et al. | 568/601 |
| 3,715,378 A | 2/1973 | Sianesi et al. | 558/283 |
| 4,094,842 A * | 6/1978 | Wenzel et al. | 260/29.2 TN |
| 4,306,998 A * | 12/1981 | Wenzel et al. | 260/13 |
| 4,676,995 A | 6/1987 | Fabris et al. | 427/520 |
| 4,720,518 A | 1/1988 | Chihara et al. | 524/267 |
| 5,019,287 A * | 5/1991 | Derosa et al. | 252/54.6 |
| 5,115,007 A | 5/1992 | Chihara et al. | 524/267 |
| 5,248,431 A * | 9/1993 | Fujita et al. | 252/49.3 |
| 5,502,225 A * | 3/1996 | Kleiner et al. | 554/42 |
| 5,939,363 A * | 8/1999 | Toyota et al. | 508/106 |
| 6,387,999 B1 * | 5/2002 | Dirschl et al. | 524/537 |

FOREIGN PATENT DOCUMENTS

| | | |
|---|---|---|
| EP | 0239123 | 9/1987 |
| EP | 0 430 266 A2 | 6/1991 |
| EP | 0 689 908 A1 | 1/1996 |
| EP | 0 761 791 A1 | 3/1996 |
| EP | 0 903 385 A1 | 3/1999 |
| EP | 0 969 055 A1 | 1/2000 |
| EP | 1 059 319 A2 | 12/2000 |
| GB | 1104482 | 2/1968 |
| JP | 11-291769 | 10/1999 |

OTHER PUBLICATIONS

Database WPI, Section Ch, Week 199423, Derwent Publications Ltd., London, GB, Class A14, AN 1994–186501, XP–002177029 & JP 06 122838 A, May 6, 1994.

Database WPI, Section Ch, Week 199425, Derwent Publications Ltd., London, GB; Class A25, AN 1994–206765, XP–002177030 & JP 06 145598 A, May 24, 1994.

* cited by examiner

*Primary Examiner*—Ellen M. McAvoy
(74) *Attorney, Agent, or Firm*—Arent Fox Kintner Plotkin & Kahn PLLC

(57) ABSTRACT

Use of fluorinated polyurethanes thermally crosslinkable for obtaining coatings having an improved friction coefficient for the dry lubrication of rubbers, plastics, metals, glass, said polyurethanes obtainable from aqueous dispersions of cationic oligourethanes having a molecular weight $\leq 9,000$, formed by:

a) polyisocyanates, having NCO functionality higher than 2, b) bifunctional hydrogenated monomers, c) bifunctional hydroxylated (per)fluoropolyethers, e) monofunctional hydroxyl or carboxylic (per)fluoropolyethers or monofunctional hydroxyl (per)fluoroalkanes optionally:

d) hydrogenated monomers by which it is possible to insert a crosslinkable chemical function in the oligourethane;

d') hydrogen-active compounds, able to form with the NCO functions thermolabile bonds.

28 Claims, No Drawings

POLYURETHANES HAVING A LOW FRICTION COEFFICIENT

The present invention relates to the use of polymer dispersions for the dry lubrication of hydrogenated polymer materials such for example rubbers, for example EPR, EPDM, SBR, or plastics, metals, glass having an improved friction coefficient. More specifically said polymer dispersions are aqueous dispersions of cationic fluorinated oligourethanes obtained from functional (per)fluoropolyethers (PFPE) which optionally can be formulated with other fluoropolymers.

Generally the dry lubrication is selected when it is necessary to maintain for long time the lubricant effect among the surfaces in contact, avoiding theyr damage by the friction. By this treatment therefore it is possible to maintain during the time the properties of said surfaces. The dry lubrication has a remarkable importance when the materials in contact are rubber or plastic materials, and therefore they generally have poor wear resistance. An example of dry lubrication is that which occurs on the rubber parts used as fittings for the mobile glass safety or not of cars for reducing the friction and noise. Said fittings, that besides friction are exposed to the action of the light and atmospheric agents, must be lubricated so that the rubber surface is not worn and maintains during the time the mechanical properties.

Dry lubrication systems for improving the friction coefficient are known in the prior art. Formulations based on polysiloxanes and silicon rubber, crosslinkable at 150° C. with hydrosoluble polyamines, able to form coatings having a thickness from 1 to 3 microns on rubbery surfaces EPDM type and to give a friction coefficient from 0.4 to 0.7 (1 Kg, 100 mm/min) are described in EP 761,791. The drawback of said formulations is that the friction coefficient is not satisfactory and besides thy are bicomponent systems wherefore the pot life is not high. In C.A. 131 300652t No. 22 1999, page 676, the Abstract of the patent JP 11 291769 is reported, wherein a coating for EPDM rubber is described, obtained by mixing with a polyurethane prepolymer based on polytetramethylenglycol (PTMG) a fluoresin in powder and a perfluoropolyether. Tests carried out by the Applicant with hydrogenated polyurethane prepolymers and a fluoroesin in powder (PTFE) have shown that the obtained friction coefficient values are unsatisfactory. Compositions based on photocrosslinkable silicones (polyorganosiloxanes having epoxy functionality), particles of crosslinked silicone resin, having sizes from about 0.5 to 12 microns, able to give coatings having a low friction coefficient, are described in EP 903,385. Said formulations require the use of UV lamps for the photocrosslinking after the coating application and drying. From the industrial point of view this kind of crosslinking is an additional cost of the plant. In U.S. Pat. No. 5,115,007 formulations in solvent (toluene) for obtaining coatings on EPDM rubbers, formed by blocked isocyanic prepolymers formulated together with crosslinking agents and silicone oils, are described. The application of said formulations in solvent raises problems connected to the environmental impact and to the use in the work environment of organic solvents. Besides the obtained coatings have an high thickness, in the range 11–16 microns. U.S. Pat. No. 4,676,995 describes formulations is organic solvent, based on modified polyamides containing brominated and chlorinated groups on amidic nitrogen. Said formulations are applied on rubbers EPDM type in solutions at 4% of dry product in methylene chloride, forming coatings having a low friction coefficient. Also for said formulations in solvent it can be repeated what noticed above for the use of organic solvents in this kind of compositions. Similar formulations, that use organic solvents, are described in U.S. Pat. No. 4,720,518 and besides contain fillers such silica, PTFE powder, etc.

The need was felt to carry out dry lubricant treatments on rubbers, plastics, metals and glass, applying aqueous polymer systems, so as to avoid the use of organic solvents and to reduce the environmental impact, to eliminate the problems connected to the use of said solvents in the work environment, obtaining a dry lubricant layer showing the following combination of properties:

dynamic friction coefficient (ASTM D 1894-78) <0.4, preferably ≦0.3, high adhesion to the treated surface (ASTM D 3359-87), high resistance to photooxidative degradation, high rubbing-resistance, high resistance to water absorption, dry lubricant layer having a reduced thickness, in the range 0.1–5 microns, preferably 1–3 microns.

The Applicant has unexpectedly and surprisingly found that it is possible to obtain said combination of properties by applying aqueous dispersions of thermocrosslinkable fluorinated oligourethanes having a cationic functionality.

An object of the present invention is the use of fluorinated polyurethanes thermally crosslinkable for obtaining coatings having an improved friction coefficient for the dry lubrication of rubbers, plastics, metals, glass, said crosslinkable polyurethanes obtainable from aqueous dispersions of cationic oligourethanes based on branched and thermocrosslinkable (per)fluoropolyethers (PFPE), said cationic oligourethanes having a number average molecular weight lower than or equal to 9,000, determined by vapour pressure osmometry and formed by the following monomers and macromers:

a) aliphatic, cycloaliphatic or aromatic polyisocyanates, having NCO functionality, determined by titration with dibutylamine-HCl (ASTM D2572), higher than 2, preferably in the range 3–4;

b) bifunctional hydrogenated monomers having the two functions chemically different from each other (heterofunctional monomers) having the general formula:

$$X_O-(CR_1^A R_2^A)_b-Y_O \qquad (Ib)$$

wherein:

$R_1^A$ and $R_2^A$, equal to or different from each other, are H, aliphatic radicals from 1 to 10 carbon atoms, b is an integer in the range 1–20, preferably 1–10, $X_O = X_A H$ with $X_A = O, S$, $Y_O$ is a salifiable, anionic or cationic function, when in the formula (Ib) $X_O = OH$, b=1, $R_1^A = R_2^A = H$ and $Y_O$ is a hydrophilic group preferably having formula

$$-CH_2O-(CH_2-CH_2O)_{nT}-CH_3 \qquad (Ib1)$$

wherein nT is an integer in the range 3–20; and one or more of the following compounds:

c) bifunctional hydroxylated (per)fluoropolyethers (PFPE diols) having number average molecular weight in the range 400–3,000, preferably 700–2,000;

e) monofunctional hydroxyl or carboxylic (per)fluoropolyethers (e°) or monofunctional hydroxyl (per)fluoroalkanes (e'), said compounds (e°) and (e') having number average molecular weight in the range 300–1,000, preferably 400–800.

and optionally the following compounds:
  d) hydrogenated monomers with which it is possible to insert a crosslinkable chemical function in the oligourethane, said monomers having formula (Ib), wherein $R_1^A$, $R_2^A$, b and $X_O$ are as above and $Y_0$, is selected from the following functional groups:

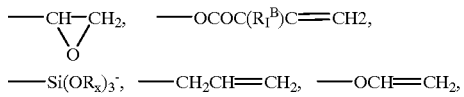

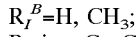

wherein
  $R_1^B = H, CH_3$;
  $R_x$ is a $C_1$–$C_5$, preferably $C_1$–$C_3$, saturated alkyl;
  d') hydrogen-active compounds, able to form with the NCO functions bonds which are stable to hydrolysis but thermolabile, said compounds known as blocking agents of the NCO group, and selected from those known in the prior art such as for example ketoximes, for example methylethylketoxime, phenols and mono-, di-alkyl substituted phenols wherein the alkyl chain contains from 1 to 8 carbon atoms, pyrazol, caprolactam, ethylmalonate, acetylacetone, ethylacetoacetate.

The preferred composition of the invention comprises a)+b)+c), optionally e).

Preferably the amounts of the components a)–c), monomers and macromers which constitute the oligourethanes according to the present invention are the following:
  component a) polyisocyanate: 10–70% by weight based on the total of the dry oligourethane, preferably 20–40% by weight;
  component b) ionic heterofunctional hydrogenated monomer: the amount by weight based on the total of the dry oligourethane is calculated in connection with the molecular weight of the monomer, taking into account that the moles of component b) are in a ratio with the moles of the NCO groups of component a) comprised between 1/3:1 and 2/3:1 [(component b) moles: NCO moles)];
  component c) PFPE diol: the amount by weight is in connection with the molecular weight of the macromer c), taking into account that the moles of the hydroxyl groups of component c) are in a ratio with the moles of the residual free NCO groups (the difference between the total ones and those combined with b)) comprised between 3 and 1.1, preferably 1.5 and 1.1; component c) can also be absent, and in this case component e) is present;
  when c) is absent, the total amount by moles of components e)+d)+d') is in a 1:1 ratio with the moles of residual NCO (the difference between the initial total moles of a) and the moles of a) reacted with b)), and component e) must be present in an amount of at least 30% by weight based on the dry product;
  when component c) is present in the formulation, the total moles of the components d+d'+e, are in a percentage comprised between 0 and 90%, preferably 0 and 60% with respect to the moles of component b).

The aliphatic, cycloaliphatic or aromatic polyisocyanates indicated in a) are those available on the market and can for example be polyisocyanurates, biurets, adducts of the following diisocyanates: hexamethylendiisocyanate HDI, isophoron diisocyanate IPDI, toluendiisocyanate TDI, diphenylmethandiisocyanate MDI, hydrogenated diphenylmethandiisocyanate H12-MDI.

Preferred compounds are Vestanat T1890® (IPDI trimer) (Huls), Tolonate® HDT-LV (HDI trimer) (Rhone-Poulenc).

With heterofunctional monomer, a monomer having a functional group at each end of the chain is meant, said functional groups being different from each other.

The heterofunctional hydrogenated monomers indicated in b) wherein preferably in the $X_A H$ function $X_A = O$, preferably have the following formula of structure:

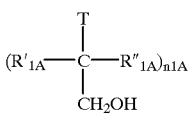

(1A)

wherein T is $SO_3H$, COOH, or a tertiary amino group $NR'_N R''_N$, wherein $R'_N$ and $R''_N$, equal or different, are linear or branched $C_1$–$C_6$ alkyl; $R'_{1A}$ and $R''_{1A}$, equal or different, are hydrogen or linear or branched $C_1$–$C_4$ alkyl; n1A is an integer in the range 1–10, preferably 1–4. The monomers b) of formula (1A) wherein T is a tertiary amino group, such as for example dimethyl-aminoethanol, diethyl-aminoethanol, dimethyl-aminopropanol, diethyl-aminopropanol, are preferred.

The bifunctional (per)fluoropolyethers indicated in c) have one or more of the following units statistically distributed along the chain: $(C_3 F_6 O)$, (CFYO) wherein Y is F or $CF_3$, $(C_2 F_4 O)$, $(CR_4 R_5 CF_2 CF_2 O)$ wherein $R_4$ and $R_5$ are equal to or different from each other and selected from H, Cl, and a fluorine atom of the perfluoromethylene unit can be substituted with H, Cl or (per)fluoroalkyl, having for example from 1 to 4 carbon atoms.

The preferred compounds of c) are the following with the perfluorooxyalkylene units statistically distributed along the chain:
  a') 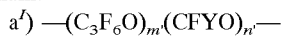
    wherein the units $(C_3 F_6 O)$ and (CFYO) are perfluorooxy-alkylene units statistically distributed along the chain: m' and n' are integers such as to give the above mentioned molecular weights, and m'/n' is in the range 5 and 40, n' being different from 0; Y is F or $CF_3$; n' can also be 0;
  b') 
    wherein p' and q' are integers such that p'/q' ranges from 5 to 0.3, preferably from 2.7 to 0.5 and such that the molecular weight is within the above limits; t' is an integer with the meaning of m', Y=F or $CF_3$; t' can be 0 and q'/(q'+p'+t') is equal to 1/10 or lower and the t'/p' ratio ranges from 0.2 to 6;
  c¹) 
    wherein R4 and $R_5$ are equal to or different from each other and selected from H, Cl; the molecular weight such to be within the above limits, and a fluorine atom of the perfluoromethylene unit can be substituted with H, Cl or (per)fluoroalkyl, having for example from 1 to 4 carbon atoms; the end groups of the bifunctional (per)fluoropolyethers c), said end groups being equal to or different from each other, are of the $HO(CH_2 CH_2 O)_{x0} CH_2$— type wherein x0 is an integer in the range 0–4, preferably 0–2; in the preferred compounds x0=0.

These (per)fluoropolyethers are obtainable by known processes. See U.S. Pat. No. 3,665,041, U.S. Pat. No. 2,242,218, U.S. Pat. No. 3,715,378 and EP 239,123.

The preferred heterofunctional monomers among those indicated in d) have the same above formula (1A) of the component b) wherein R'$_{1A}$, and R"$_{1A}$ and n1A are as above defined and T is instead selected from the groups that in component d) are at the place of the Y$_0$ function, the OH group of the formula 1A can optionally be substituted with a SH group.

The process for preparing the oligourethanes is described in the European patent application EP 00112141.7 in the name of the Applicant.

Under the application conditions used for the crosslinking of the formulations, the thermal crosslinking of the cationic oligourethane is obtained without the hydrogen-active compounds belonging to the above class d'), when the heterofunctional monomers component b) are aminoalcohols having the above general formula (1A). When said aminoalcohols are present in the oligomer, it is possible indeed by thermal treatment to restore the NCO function of the urethane bond with the hydroxyl group of the heterofunctional monomer component b) as above defined, lowering the amount of the ionic groups present on the oligourethane structure (aminoalcohol evaporates at the crosslinking temperature) which is under crosslinking. Without to be bound to any theory, this fact could explain the high resistance to water and the maintenance of the improved friction coefficient in the time, as it is shown in the following Examples, of the coatings obtained with the oligourethanes as above defined.

When component e) is formed by monofunctional hydroxyl or carboxylic (per)fluoropolyethers (e$^0$), they comprise one or more of the (per)fluorooxyalkylene units above indicated for the PFPE diol component c).

Preferred (e$^0$) compounds are for example the following ones, wherein the following units are statistically distributed along the chain:

IB) A'O(C$_3$F$_6$O)$_m$(CFYO)$_n$—
  wherein Y is —F, —CF$_3$; A'=—CF$_3$, —C$_2$F$_5$, —C$_3$F$_7$, —CF$_2$Cl, C$_2$F$_4$Cl; the C$_3$F$_6$O and CFYO units are randomly distributed along the (per)fluoropolyether chain, m and n are integers, the m/n ratio is $\geq 2$. These compounds are obtainable by hexafluoropropene photooxidation according to the process described in GB 1,104,482;

IIB) C$_3$F$_7$O(C$_3$F$_6$O)$_m$—
  wherein m is a positive integer, wherein the number average molecular weight is the one above indicated. These compounds are obtainable by ionic telomerization of hexafluoropropene epoxide: see for example U.S. Pat. No. 3,242,218;

IIIB) (C$_3$F$_6$O)$_m$(C$_2$F$_4$O)$_n$(CFYO)$_q$—
  wherein Y is equal to —F, —CF$_3$; m, n and q, different from zero, are integers such that the number average molecular weight is that indicated for the component e). Said compounds are obtainable by photooxidation of mixtures of C$_3$F$_6$ and C$_2$F$_4$ by the processes described in U.S. Pat. No. 3,665,041;

the reactive monofunctional end group is of the T$_b$(CH$_2$CH$_2$O)$_{x0}$CH$_2$— type wherein x0 is an integer between 0 and 4, preferably 0 and 2, more preferably x0 =0, T$_b$ is OH.

Alternatively, when the component e$^0$ is a monofunctional carboxylic (per)fluoropolyether, the monofunctional end group is —CF$_2$—COOH.

When component e) is formed by monofunctional hydroxyl (per)fluoroalkanes (e'), said compounds preferably have the formula:

(R$_{fl}$)$_{pl}$Q—OH     (e')

wherein:
  R$_{fl}$ is a C$_3$–C$_{30}$, preferably C$_3$–C$_{20}$ fluoroalkyl radical;
  pI is 1 or 2;
  Q is a bivalent C$_1$–C$_{12}$ aliphatic or C$_6$–C$_{12}$ aromatic linking bridge; Q can optionally contain heteroatoms such as N, O, S, or carbonylimino, sulphonylimino or carbonyl groups; Q can be not substituted or it is linked to substituents selected from the following: halogen atoms, hydroxyl groups, C$_1$–C$_6$ alkyl radicals; Q preferably does not contain double or triple bonds and is saturated; preferably Q is selected from the following divalent radicals: —CH$_2$—, —C$_2$H$_4$—, —SO$_2$N(R$^5$) C$_2$H$_4$—, —SO$_2$N(R$^5$)CH$_2$CH(CH$_3$)—, —C$_2$H$_4$SO$_2$N (R$^5$)C$_4$H$_8$—, R$^5$ being H or a C$_1$–C$_4$ alkyl.

When the monofunctional PFPE component e$^0$ has a carboxylic end function, the bond formed with —NCO is of amidic type instead of urethane type.

The oligourethanes according to the present invention have a number average molecular weight preferably in the range 2,000–9,000. The number average molecular weight can be determined by methods known in the prior art, such as for example vapour pressure osmometry VPO. Suitable solvents for carrying out said determinations are the fluorinated ones such as trifluoroethanol, or also non fluorinated such as for example ethyl acetate.

The starting compositions containing the oligourethanes for obtaining the coatings to be applied on materials such as rubbers, plastics, metals and glass for the use according to the present invention are under the form of monocomponent aqueous dispersions. The formulation stability is over 12 months.

The dry content is in the range 1–70%, preferably 10–30% by weight.

Said aqueous dispersions usable according to the present invention are obtained by salifying the oligomer in organic solvent adding an acid, which can be organic or inorganic, dispersing the organic mixture in water and eliminating the organic solvents by evaporation.

The Applicant has found that the lubricant properties of the polymers of the present invention can be furtherly improved by formulating the oligourethanes in aqueous dispersion in mixture with other different fluoropolymers.

The total percentage by weight of fluoropolymers which are added to the aqueous dispersion of the oligourethane ranges from 0 to 30%, preferably from 1 to 10%.

TFE (co)polymers can for example be used, preferably using the corresponding concentrated polymerization latexes, preferably stabilized by mixtures of non ionic and cationic surfactants. Non ionic surfactant is for example Triton® X100. As cationic surfactants cetyl trimethylammonium bromide can be mentioned.

The TFE (PTFE) homopolymers or the TFE copolymers with one or more comonomers containing at least one unsaturation of ethylene type can be used both in powder and under the form of latex, preferably they are used under the form of latex or dispersion. The latexes or dispersions of TFE fluoropolymers are formed by homopolymers of tetrafluoroethylene (TFE) or its copolymers with one or more monomers containing at least one unsaturation of ethylene type. The amount of comonomer can for example range from 0 up to 3% by moles, preferably from 0.01 to 1% by moles; the average particle sizes range from 20 to 400 nm, preferably from 80 to 300 nm. These aqueous dispersions from 180 to 400 nm are available on the market as Algoflon® D60 and they are obtainable by the conventional polymerization processes in aqueous emulsion.

The dispersions of the homopolymers and copolymers of TFE wherein the average particle sizes range from 20 to 80 nm, preferably 20–60 nm, can also be formed by TFE thermoplastic copolymers, preferably copolymers containing from 7 to 27% by weight of hexafluoropropene; copolymers containing from 0.5 to 18% by weight, in particular from 2 to 10% by weight of one or more perfluoroalkylvinylethers and/or fluorinated dioxoles, preferably selected from methyl-, ethyl-, propylvinylether, 2,2,4-trifluoro-5-trifluoromethoxy-1,3-dioxole (TDD), perfluoro-2,2-dimethyl-1,3-dioxole (PDD).

Mixtures of dispersions containing both particles from 190 to 400 nm and those from 20 to 80 nm can also be used. The ratio by weight between the dispersions with the component having higher particle sizes with respect to the dispersions with the component having lower particle sizes can range from 99:1 to 1:99.

The nanometric aqueous dispersions between 20 and 80 nm are obtainable by the polymerization process in microemulsion described in patent application EP 969,055 in the name of the Applicant.

It has been found that the addition to the oligourethane dispersions of (per)fluoropolyethers having (per)fluorinated end groups and kinematic viscosity at 20° C. in the range 30–300 Centistokes (3 300×$10^7$m$^2$/s) (ASTM D 445), allows to decrease the rigidity of the crosslinked fluorinated oligourethane. The non reactive PFPE amount is generally in the range 0–20%, the upper limit is the one that does not lead to the formation of two or more phases but only one aqueous phase of the polymers of the invention dispersed in water is obtained. The (per)fluoropolyethers having (per)fluorinated end groups are added to the organic solution containing the oligourethane, which is then salified and dispersed in water, lastly removing the organic solvent used in the oligourethane synthesis. To the so obtained formulation it is possible to add TFE fluorinated polymers as above defined, preferably under latex form.

The catalyst chemical classes both for the synthesis of the oligourethanes of the invention and for unblocking the thermolabile groups are well known in the prior art. The organometal or aminic ones commonly used for the polyurethane synthesis can be mentioned; those soluble or dispersible in water such as for example: dibutyltindilaurate or dialkyltin salts having mobile bridging bonds Sn—S, for example Fastcat® 4224 are particularly preferred; diethylentriamine, ethylendiamine, Jeffamina® T 403 (triamine linked to a polyoxypropylene chain), N-ethyl-ethylendiamine, diazobicycle octane, etc., can be mentioned as amines. The catalyst is added in concentrations generally ranging from 0.1 to 5% by weight and preferably from 0.5 to 1%. For the synthesis of the oligourethanes of the invention it is preferable to use a small amount of catalyst, while the catalyst for unblocking the thermolabile groups is added to the water formulation even just obtained. As said the stability of this monocomponent formulation is very high wherefore it is industrially very useful for the production cycles.

The formulations of the invention are easily applicable also at concentrations of 40% in dry product, since the viscosity is low also at these concentrations.

Additives such as catalysts as above indicated, crosslinking co-catalysts, ionic and non ionic, also fluorinated, surfactants, photostabilizing additives, fillers and pigments can optionally be added to the finished water formulation. Photostabilizing additives are for example UV adsorbers, for example hydroxybenzophenone, hydroxybenzotriazole derivatives, etc., HALS (hindered amines), such as for example derivatives from tetramethyl-piperidine, etc. Additives pigment type are for example metal oxides such as titanium dioxide, iron oxides, mixed oxides of Ni, Co, Zn, Ti, or Cr, Cu or Fe, Ni, Cr, Mn, cobalt aluminates; organic pigments such as derivatives from anthraquinone, quinacridone, tetrachloroisoindolinone, diketoperylene, phthalocyanines, etc.), and fillers such as for example silica, polyamides having 20–100 s sizes, glass spheres zeolites type.

Other additives which can be added are thixotropic agents, dispersants, preferably polymers, for pigments and fillers; extending, anticissing, antifoam additives, etc.

The dispersion containing the oligourethanes, formulated with the above additives, can be diluted with water up to oligourethane concentrations, expressed as percentages by weight, in the range 1–50%, preferably 10–45%.

The dispersions according to the present invention are applied by conventional methods, for example by spray, roll or dipping on the above substrata.

The coating thickness is in the range 0.1–5 microns, preferably 1–3 microns.

The invention coatings are effective also at said very low thickness values and this represents an advantage since the bulk mechanical properties, such as elongation, modulus, bending of the substratum are not substantially modified.

Preferably the structural surface in hydrogenated polymer material (rubber or plastic) on which the dispersion of the oligourethanes must be applied, is previously subjected to a treatment, such as for example plasma or corona treatment, to generate on the surface of the polymer material reactive polar sites, to improve both the wettability with the aqueous dispersion and the adhesion to the surface after crosslinking of the oligourethane. Depending on the type of the atmosphere (air, oxygen, nitrogen) in which the plasma or corona treatment is carried out, various reactive groups such as for example —OH, —COOH, —CO—, —NHR— functions can form on the surface of the hydrogenated polymer material. These functions are able to cause interactions both of physical and chemical nature with the cationic groups and the —NCO groups which are generated in the oligourethane during the thermal unblocking reaction during crosslinking, assuring a very good adhesion to the hydrogenated polymer substratum.

The use according to the present invention is carried out, as said, by applying the dispersions containing the oligourethanes on the surfaces of the above materials by the previously described methods, subsequent drying and crosslinking at temperatures of 130° C. or higher for a period of time in the range 1–30 minutes, in connection with the used temperature. For example, at a temperature of 180° C. crosslinking is completed in 5 minutes.

The following Examples illustrate the invention, without limiting the scope thereof.

EXAMPLES

The analytical methods which have been used in the Examples are the following:

Determination of the NCO titre of the isocyanic prepolymers or oligomers: ASTM D 2572.

Friction coefficient: : ASTM D 1894-78.

Determination of the friction coefficient according to ASTM D 1894-78 after conditioning in a stove at 80° C. for 7 days, in atmosphere having 50% relative humidity (test of water absorption in humidistat, 50% relative humidity, 80° C., 7 days).

Determination of the friction coefficient according to ASTM D 1894-78 after QVB ageing (ASTM D 2244 method): the specimen is treated for 500 hours alternating the following cycles: 4 h of light at 60° C., 4 h of condense for dippings in saturated atmosphere, at 40° C.

Adhesion (cross-cut test): ASTM D 3359-87.

Resistance to water: a cotton flock is soaked in water and a specimen is rubbed in the same direction in the two ways, uninterruptedly, exerting a force on the specimen corresponding to 1 kg weight. The test is passed if the coating is not visibly altered or removed after 200 double strokes.

Friction coefficient after abrasion test: the rubber specimen coated on one side by crosslinking the oligourethane, optionally in the presence of the above fluorinated polymers, is rubbed on a glass plane in the same direction in the two ways, uninterruptedly, exerting a force on the specimen corresponding to the weight of 1 kg, for 1,000 double strokes. After the treatment the friction coefficient is determined by the above ASTM method.

Example 1

Synthesis of a Cationic Oligourethane Containing the IPDI Trimer Component a), Dimethylaminopropanol Component b) and a Perfluoropolyether Diol Component c)

400 g of Vestanat® T1890/100 dissolved in 400 g of anhydrous ethyl acetate are fed in a first 2 litres glass reactor equipped with mechanical stirring, thermometer, reflux condenser and maintained under nitrogen. The solution is heated up to 70° C. and then 2.5 ml of solution at 20% by weight of Fascat® 4224 are added and in 1 hour 55.07 g of dimethylaminopropanol are dropped. The mixture is let react for an additional hour and the NCO titre is measured.

1171 g of perfluoropolyether diol Fomblin® ZDOL having hydroxyl equivalent weight 730, diluted with 297 g of anhydrous ethyl acetate are introduced in a second 5 litres reactor. The solution is heated up to 78° C. and the polyisocyanate is dropped in 1 hour, under stirring and under nitrogen atmosphere from the first reactor into the second reactor. The mixture is let react until the NCO absorption band disappears (2270 cm$^{-1}$ at the IR spectroscopy).

The reaction mixture is brought again to room temperature.

Acetic acid (38.49 g) dissolved in N-methylpyrrolidinone (NMP, 162 g) is added under stirring and the mixture is let react for 30 minutes. Subsequently in 1 hour 3.8 kg of distilled water are added at room temperature and under strong stirring (500 rpm), until a cationic polymer dispersion in water is obtained. The ethyl acetate is removed by evaporation at 40° C. at the residual pressure of 50 mm Hg. The obtained aqueous polymer dispersion of the cationic oligomer (PUD) has a titre in dry product of 30% as percentage by weight.

Example 2

Application of an Aqueous Formulation Containing the Oligourethane of Example 1 on EPDM Specimen Starting from the dispersion obtained in Example 1 an aqueous formulation is prepared wherein the parts by weight among the components, excluding water, are the following:

| | |
|---|---|
| Cationic PUD | 97 |
| Tinuvin ® 1130 | 1.8 |
| Tinuvin ® 292 | 0.9 |
| Fascat ® 4224 | 0.3 |

No. 3 EPDM specimens having 10×5 cm sizes are subjected to a preliminary plasma treatment for 6 minutes at a 10 Watt power. This treatment reduces the contact angle with $H_2O$ from 95° to 50°, thus making wettable the treated specimen surface. The treated surface is coated by spray application with a dispersion containing 20% w/w in water of the above component mixture. After treatment in an airy stove for 5 minutes at 80° C. for removing the aqueous solvent and the residual organic ones (flash period), the specimen is crosslinked at 180° C. for 5 min.

The specimens are then characterized with the tests

| | |
|---|---|
| Friction coefficient: | 0.30–0.40 |
| Friction coefficient after treatment in humidistat: | 0.30–0.40 |
| Friction coefficient after ageing at QVB: | 0.30–0.40 |
| Adhesion: | 100% |
| Resistance to water | >200 d.s. (double strokes) |

The results show that the friction coefficient of the treated surface of the specimens does not undergo variations after treatment according to the water absorption (humidistat) and ageing at QVB tests. The adhesion and water resistance properties are very good.

Example 3

Application of an Aqueous Dispersion Containing the Oligourethane of Example 1, in Mixture with PTFE Formed by Particles Having 90 nm Diameter, on EPDM Specimen Starting from the dispersion obtained in Example 1, an aqueous formulation is prepared wherein the parts by weight among the components, excluding the solvent, are the following:

| | |
|---|---|
| Cationic PUD | 92 |
| PTFE (particle diameter 90 nm) | 4.6 |
| Triton ® | 0.4 |
| CTAB | 0.1 |
| Tinuvin ® 1130 | 1.8 |
| Tinuvin ® 292 | 0.9 |
| Fascat ® 4224 | 0.2 |

PTFE is added under the form of an aqueous dispersion, which is prepared by adding to a concentrated PTFE latex (Algoflon® L100, titre 25% w/w, particle diameter 90 nm) Triton and the cationic surfactant CTAB (cetyl trimethyl ammoniumbromide) in the necessary amounts for obtaining the above mentioned formulation. The PTFE dispersion is added to the aqueous dispersion of Example 1 and then the other components Tinuvin® 1130, Tinuvin® 292, Fascat® 4224 are added.

No. 3 EPDM specimens are used the surface of which is subjected to the same preliminary treatment described in Example 2. The treated surface of the specimen is then covered by dip coating using a dispersion containing 20% w/w in water of the above component mixture.

The specimen characterization using the tests of Example 2 has given the following results:

| | |
|---|---|
| Friction coefficient: | 0.20–0.25 |
| Friction coefficient after treatment in humidistat: | 0.20–0.25 |
| Friction coefficient after ageing at QVB: | 0.20–0.25 |
| Friction coefficient after abrasion test: | 0.20–0.25 |
| Adhesion: | 100% |
| Resistance to water | >200 d.s. |

The results show that the friction coefficient does not undergo variations after treatment according to the water absorption (humidistat) and ageing at QVB tests.

The PTFE addition to the formulation improves the friction coefficient values with respect to those obtained in Example 2.

Example 4

Application of an Aqueous Dispersion Containing the Oligourethane of Example 1, in Mixture with PTFE Formed by Particles Having 200 nm Diameter on EPDM Specimens Starting from the dispersion obtained in Example 1, an aqueous formulation is prepared wherein the parts by weight among the components, excluding the solvent, are the following:

| | |
|---|---|
| Cationic PUD | 92.5 |
| PTFE (particle diameter 200 nm) | 4.6 |
| Tinuvin ® 1130 | 1.8 |
| Tinuvin ® 292 | 0.9 |
| Fascat ® 4224 | 0.2 |

The used dispersion is prepared by mixing a PTFE dispersion having 65% titre w/w (Algoflon® D60) to the aqueous dispersion of Example 1 and adding then the other components.

No. 3 EPDM specimens are used the surface of which is subjected to the same preliminary treatment described in Example 2. The treated surface of the specimen is coated by spray using a dispersion containing 20% w/w in water of the above component mixture.

The specimen characterization using the tests of Example 2 has given the following results:

| | |
|---|---|
| Friction coefficient: | 0.20–0.21 |
| Friction coefficient after treatment in humidistat: | 0.20–0.21 |
| Friction coefficient after ageing at QVB: | 0.22–0.21 |
| Adhesion: | 100% |
| Resistance to water | >200 d.s. |

The results show that the friction coefficient does not undergo variations after treatment according to the water absorption (humidistat) and ageing at QVB tests.

The PTFE addition to the applied formulation improves, as in the previous Example 3, the friction coefficient values with respect to those obtained in Example 2.

Example 5

Synthesis of a Cationic Oligourethane Containing the IPDI Trimer Component A), Dimethylaminopropanol Component B) and a Perfluoropolyether Diol Component C), and Preparation of a Dispersion Containing the Oligourethane and a Perfluoropolyether Having Non Reactive End Groups One proceeds as described in Example 1 until the end of the polymerization in the organic solvent and cooling at room temperature of the reaction mixture.

56.27 grams of the organic solution having a dry content equal to 41.08 g, are introduced in a two-necked 100 ml flask, equipped with mechanical stirrer. 2.05 g of a perfluoropolyether having non reactive end groups and number average molecular weight of 3,000 (Fomblin® Y25) are added drop by drop and the mixture is kept under stirring for 1 h. The oligourethane is subsequently salified by adding 0.977 g of acetic acid dissolved in 4.1 g of NMP, and then dispersed in water as describe in Example 1. The dry content of the finished aqueous dispersion is 30% w/w.

Example 6

Application of the Aqueous Dispersion of Example 5, Containing the Oligourethane and the Perfluoropolyether Having Non Reactive End Groups on EPDM, Aluminum and Glass Specimens, Respectively Starting from the aqueous dispersion of Example 5, an aqueous formulation is prepared wherein the parts by weight among the components, excluding the solvent, are the following:

| | |
|---|---|
| Cationic PUD | 92.5 |
| Fomblin ® Y25 | 4.6 |
| Tinuvin ® 1130 | 1.8 |
| Tinuvin ® 292 | 0.9 |
| Fascat ® 4224 | 0.2 |

No. 3 EPDM specimens are treated according to the process described in Example 2, applying by spray a dispersion containing 20% w/w of the above reported composition.

The specimen characterization using the same tests previously described has given the following results:

| | |
|---|---|
| Friction coefficient: | 0.26–0.30 |
| Friction coefficient after treatment in humidistat: | 0.26–0.30 |
| Friction coefficient after ageing at QVB: | 0.26–0.30 |
| Adhesion: | 100% |
| Resistance to water | >200 d.s. |

The results show that the friction coefficient does not undergo variations after treatment according to the water absorption (humidistat) and ageing at QVB tests.

The addition of a perfluoropolyether having non reactive end groups to the formulation improves the friction coefficient values with respect to those obtained in Example 2.

No. 3 aluminum specimens of the same sizes described for the EPDM specimens are coated by spray using the same aqueous dispersion at 20% w/w and the characterization tests are repeated on the so treated specimens.

The obtained results are not meaningfully different from those of the EPDM specimens.

No. 3 glass specimens having the same sizes described for the EPDM specimens are coated by spray by using the same aqueous dispersion at 20% w/w and the characterization tests are repeated.

The obtained results are not meaningfully different from those of the EPDM specimens.

Example 7

Application of the Aqueous Dispersion of Example 5, Containing the Oligourethane and the Perfluoropolyether Having Non Reactive End Groups, Additived with PTFE Formed by Particles Having 200 nm Diameter, on EPDM, Aluminum and Glass Specimens, Respectively

Starting from the aqueous dispersion obtained at the end of Example 5, an aqueous formulation is prepared wherein the parts by weight among the components, excluding the solvent, are the following:

| | |
|---|---|
| Cationic PUD | 88 |
| Fomblin ® Y25 | 4.6 |
| PTFE (particle diameter 200 nm) | 4.5 |
| Tinuvin ® 1130 | 1.8 |
| Tinuvin ® 292 | 0.9 |
| Fascat ® 4224 | 0.2 |

The PTFE dispersion is prepared as described in Example 4. The finished aqueous formulation is obtained according to the process reported in the same Example.

No. 3 EPDM specimens are treated according to the process described in Example 2, applying by spray the dispersion containing 20% w/w of the above composition.

The characterization of the specimens using the same tests previously described has given the following results:

| | |
|---|---|
| Friction coefficient: | 0.19–0.21 |
| Friction coefficient after treatment in humidistat: | 0.19–0.21 |
| Friction coefficient after ageing at QVB: | 0.19–0.21 |
| Adhesion: | 100% |
| Resistance to water | >200 d.s. |

The results show that the friction coefficient does not undergo variations after treatment according to the water absorption (humidistat) and ageing at QVB tests.

The addition of a perfluoropolyether having non reactive end groups and of PTFE to the formulation improves the friction coefficient values with respect to those obtained in the previous Examples 3, 4 and 6.

No. 3 aluminum specimens of the same sizes described for the EPDM specimens are coated by spray using the same aqueous dispersion containing 20% w/w of the above reported composition and the characterization tests are repeated on the so treated specimens, obtaining the following results:

| | |
|---|---|
| Friction coefficient: | 0.12–0.13 |
| Friction coefficient after treatment in humidistat: | 0.12–0.13 |
| Friction coefficient after ageing at QVB: | 0.12–0.13 |
| Adhesion | 100% |
| Resistance to water | >200 d.s. |

No. 3 glass specimens having the same sizes described for the EPDM specimens are coated by spray using the same aqueous dispersion at 20% w/w and the characterization tests are repeated, obtaining the following results:

| | |
|---|---|
| Friction coefficient: | 0.12–0.13 |
| Friction coefficient after treatment in humidistat: | 0.12–0.13 |
| Friction coefficient after ageing at QVB: | 0.12–0.13 |
| Adhesion | 100% |
| Resistance to water | >200 d.s. |

The friction coefficient values obtained on the coated aluminum and glass specimens are better than those obtained on EPDM.

Example 8

Synthesis of a Cationic Oligourethane Containing the IPDI Trimer Component A), Dimethylaminopropanol Component B), Perfluoropolyether Diol Component C), and a Carboxylic Monofunctional Perfluoropolyether Component E)

400 g of Vestanat® T1890/100 dissolved in 400 g of anhydrous THF are introduced in a first 2 litres glass reactor equipped with mechanical stirring, thermometer, reflux condenser and maintained under nitrogen. The solution is heated up to 70° C. and 2.5 ml of a solution at 20% w/w of Fascat® 4224 are added and 390 g of a monofunctional perfluoropolyether having a carboxylic functionality belonging to the class $e^0$ and having formula $A'O(C_3F_6O)_m(CF(CF_3)O)_nCOOH$, with $A'=ClCF_2-$, having a number average molecular weight of 970, are dropped in one hour. The mixture is let react for 2 hours at 70° C. and finally the NCO titre is determined. Subsequently 41.36 g of dimethylaminopropanol are added drop by drop in 1 h and the mixture is maintained at 70° C. under stirring under nitrogen atmosphere for an additional hour. The NCO titre is controlled.

879 g of perfluoropolyether diol (Fomblin® ZDOL) having hydroxyl equivalent weight 730, diluted with 330 g of THF at the temperature of 68° C. are introduced in a second 5 litres reactor. The polyisocyanate of the first reactor is dropped in 1 hour, under stirring, into the second reactor. The mixture is let react under stirring until the NCO absorption band disappears (2270 $cm^{-1}$ at the IR spectroscopy).

Acetic acid (28.9 g) dissolved in NMP (171 g) is added, the mixture is let under stirring for 30 minutes. Subsequently, in one hour, 4.0 kg of distilled water are added under strong stirring (500 rpm), until a dispersion in water is obtained. The organic solvent is lastly removed by evaporation (40° C., 50 mm Hg). The obtained aqueous dispersion has a titre in solid product of 30% w/w.

Example 9 (Comparative)

Preparation of Linear Fluorinated Polyurethane by Reaction of IPDI, Fascat®, Perfluoropolyether Diol Component C), Butandiol and N-Methyldiethanolamine

171.3 g of IPDI dissolved in 305 g of anhydrous ethyl acetate are introduced in a 2 litres glass reactor equipped with mechanical stirring, thermometer, reflux condenser and maintained under nitrogen. The solution is heated up to 70° C. and 2.4 ml of a solution at 20% w/w of Fascat® 4224 are added. 500 g of perfluoropolyether diol (Fomblin® ZDOL) having hydroxyl equivalent weight 650 are dropped in two hours. The mixture is let react for an additional hour and the NCO titre is determined.

The reaction temperature is lowered to 55° C., and a mixture of butandiol 17.3 g and N-methyldiethanolamine 23 g is dropped in about 30 minutes.

The mixture is let under stirring until the NCO absorption band disappears (2270 cm$^{-1}$ at the IR spectroscopy).

Acetic acid (13.87 g) dissolved in NMP (71 g) is added, the mixture is let under stirring for 30 minutes. 1660 g of distilled water are added in one hour under strong stirring (500 rpm), until a cationic polymer dispersion in water is obtained. The organic solvent is lastly removed by evaporation (40° C., 50 mm Hg) until obtaining a polymer dispersion in water at 30% w/w of polyurethane.

Example 10

Application of the Acueous Dispersion of the Comparative Example 9, Containing the Linear Polyurethane, Additived with PTFE Formed by Particles Having 200 nm Diameter, On EPDM, Aluminum and Glass Specimens, Respectively Starting from the aqueous dispersion obtained at the end of Example 9, an aqueous formulation is prepared wherein the parts by weight among the components, excluding the solvent, are the following:

| | |
|---|---|
| Linear polyurethane | 92.6 |
| PTFE (particle diameter 200 nm) | 4.7 |
| Tinuvin ® 1130 | 1.8 |
| Tinuvin ® 292 | 0.9 |

The PTFE dispersion is prepared as described in Example 4. The finished aqueous formulation is obtained according to the procedure which is reported in the same Example.

No. 3 EPDM specimens are treated as described in Example 2, applying by spray the aqueous dispersion containing the 20% w/w of the above reported composition.

It is observed that the so treated specimens show at the visual inspection an irregular and unhomogeneous surface. A series of determinations of the friction coefficient on these specimens shows that the data are not homogeneous and that therefore the coefficient cannot be determined.

The same results are obtained applying by spray the same dispersion on glass and aluminum specimens.

Example 11

Synthesis of a Hydrogenated Oligomer Containing IPDI Trimer Component A), Fascat®, DMAP, PTMEG (Polytetramethylenglycol)

50 g of Vestanat® T1890/100 dissolved in 50 g of anhydrous ethyl acetate are introduced in a first 250 ml glass reactor equipped with mechanical stirring, thermometer, reflux condenser and maintained under nitrogen. The solution is heated up to 70° C. and 0.32 ml of a solution at 20% w/w of Fascat® 4224 are added and 6.89 g of dimethylaminopropanol are dropped in one hour.

The mixture is let react for an additional hour and the NCO titre is finally determined.

100.3 g of PTMEG having hydroxyl equivalent weight 500, diluted with 20 g of anhydrous ethyl acetate, heated up to a temperature of 70° C., are introduced in a second 500 ml reactor. The polyisocyanate of the first reactor is dropped in 1 hour, under stirring into the second reactor. The mixture is let under stirring for an additional hour until the NCO absorption band disappears (2270 cm$^{-1}$ at the IR spectroscopy).

Acetic acid (4.8 g) dissolved in NMP (15.7 g) is added, the mixture is let under stirring for 30 minutes. 378 g of distilled water are added in one hour under strong stirring (500 rpm), until a cationic polymer dispersion in water is obtained. The organic solvent is lastly removed by evaporation (40° C., 50 mmHg) obtaining a polymer dispersion in water at 30% w/w.

Example 12

Application of the Aqueous Dispersion of the Comparative Example 11, Containing the Linear Polyurethane, Additived with PTFE Formed by Particles Having 200 nm Diameter, on EPDM. Aluminum and Glass Specimens, Respectively Starting from the aqueous dispersion obtained at the end of Example 11, an aqueous formulation is prepared wherein the parts by weight among the components, excluding the solvent, are the following:

| | |
|---|---|
| Hydrogenated oligourethane | 92.4 |
| PTFE (particle diameter 200 nm) | 4.7 |
| Tinuvin ® 1130 | 1.8 |
| Tinuvin ® 292 | 0.9 |
| Fascat ® 4224 | 0.2 |

The PTFE dispersion is prepared as described in Example 4. The finished aqueous formulation is obtained according to the process which is reported in the same Example.

No. 3 EPDM specimens are treated as described in Example 2, applying by spray the aqueous dispersion containing 20% w/w of the above reported composition.

The determination of the friction coefficient on the so obtained specimens has given values in the range: 0.55–0.60.

The friction coefficient in this case results more than the double with respect to that determined on the specimens obtained as described in Example 4, which have been coated by spray with an aqeuous dispersion having the same titre by weight in a composition containing the same parts by weight of the above components, except the oligourethane component that in the case of the present Example is hydrogenated and it does not contain fluorine atoms, while in Example 4 it is fluorinated.

The experiment shows that a hydrogenated oligourethane having the same structure as the fluorinated ones of the present invention, is not able to form coatings with the same friction coefficient.

No. 3 aluminum specimens of the same sizes described for the EPDM specimens are coated by spray using the same aqueous dispersion containing 20% w/w of the above reported composition.

The determination of the friction coefficient on the so obtained specimens has given values in the range: 0.51–0.53.

The friction coefficient values obtained on aluminum are lower than those on EPDM but they are still twice higher than those of Example 4.

What is claimed is:

1. A process for dry lubrication of rubbers, plastics, metals, and glass materials, comprising applying to said materials a coating of thermally crosslinkable fluorinated polyurethanes, thermally crosslinkable, obtainable from aqueous dispersions of cationic oligourethanes based on branched and thermocrosslinkable (per)fluoropolyethers, said cationic oligourethanes having a number average molecular weight lower than or equal to 9,000, determined by vapour pressure osmometry and formed by the following monomers and macromers:

a) aliphatic, cycloaliphatic or aromatic polyisocyanates, having NCO functionality, determined by titration with dibutylamine-HCl according to ASTM D2572, higher than 2;

b) bifunctional hydrogenated monomers having the two functions chemically different from each other having the general formula:

$$X_0-(CR_1^A R_2^A)_b-Y_0 \quad (Ib)$$

wherein:

$R_1^A$ and $R_2^A$, equal to or different from each other, are H, aliphatic radicals from 1 to 10 carbon atoms, b is an integer in the range 1–20, $X_0=X_A H$ with $X_A=O, S$, $Y_0$ is a salifiable, anionic or cationic function, when in the formula (Ib) $X_0=OH$, b=1, $R_1^A=R_2^A=H$ and $Y_0$ is a hydrophilic group having formula $$-CH_2O-(CH_2-CH_2O)_{nT}-CH_3 \quad (Ib1)$$

wherein nT is an integer in the range 3–20;

and one or more of the following compounds:

c) bifunctional hydroxylated (per)fluoropolyethers having number average molecular weight in the range 400–3,000;

e) monofunctional hydroxyl or carboxylic (per)fluoropolyethers (e°) or monofunctional hydroxyl (per)fluoroalkanes (e'), said compounds (e°) and (e') having number average molecular weight in the range 300–1,000; and optionally the following compounds:

d) hydrogenated monomers with which it is possible to insert a crosslinkable chemical function in the oligourethane, said monomers having formula (Ib), wherein $R_1^A$, $R_2^A$, b and $X_0$ are as above and $Y_0$ is selected from the following functional groups:

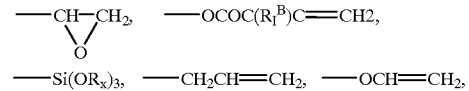

wherein $R_1^B=H, CH_3$;

$R_x$ is a $C_1-C_5$, saturated alkyl;

d¹) hydrogen-active compounds, able to form with the NCO functions bonds which are stable to hydrolysis but thermolabile, said compounds known as blocking agents of the NCO group.

2. The process according to claim 1, wherein the used composition comprises the components a) +b) +c), optionally e).

3. The process according to claim 1, wherein the amounts of the components are the following:

component a) polyisocyanate: 10–70% by weight based on the total of the dry oligourethane;

component b) ionic heterofunctional hydrogenated monomer: the amount by weight based on the total of the dry oligourethane is calculated in connection with the molecular weight of the monomer, taking into account that the moles of component b) are in a ratio with the moles of the NCO groups of component a) comprised between 1/3:1 and 2/3:1;

component c) PFPE diol: the amount by weight is in connection with the molecular weight of the macromer c), taking into account that the moles of the hydroxyl groups of component c) are in a ratio with the moles of the residual free NCO groups comprised between 3 and 1.1; component c) can also be absent, and in this case component e) is present;

when c) is absent, the total amount by moles of components e) +d) +d¹) is in a 1:1 ratio with the residual NCO moles, and component e) must be present in an amount of at least 30% by weight based on the dry product;

when component c) is present in the formulation, the total moles of the components d+d¹+e, are in a percentage comprised between 0 and 90%, with respect to the moles of component b).

4. The process according to claim 1, wherein the aliphatic, cycloaliphatic or aromatic polyisocyanates indicated in a) are polyisocyanurates, biurets or adducts of the following diisocyanates: hexamethylendiisocyanate HDI, isophoron di-isocyanate IPDI, toluendiisocyanate TDI, diphenyl-methandiisocyanate MDI, hydrogenated diphenylmethano-diisocyanate H12-MDI.

5. The process according to claim 1, wherein the heterofunctional hydrogenated monomers indicated in b) wherein in the $X_A H$ function $X_A=O$, have the following formula of structure:

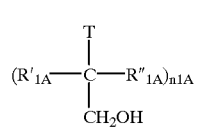

(1A)

wherein T is $SO_3H$, COOH, or a tertiary amino group $NR'_N R''_N$, wherein $R'_N$ and $R''_N$, equal or different, are linear or branched $C_1-C_6$-alkyl; $R'_{1A}$ and $R''_{1A}$, equal or different, are hydrogen or linear or branched $C_1-C_4$ alkyl; n1A is an integer in the range 1–10.

6. The process according to claim 5, wherein in the monomers b) of formula (1A) T is a tertiary amino group.

7. The process according to claim 1, wherein the bifunctional (per)fluoropolyethers indicated in c) have one or more of the following units statistically distributed along the chain: $(C_3F_6O)$, (CFYO) wherein Y is F or $CF_3$, $(C_2F_4O)$, $(CR_4R_5CF_2CF_2O)$ wherein $R_4$ and $R_5$ are equal to or different from each other and selected from H, Cl, and a fluorine atom of the perfluoromethylene unit optionally substituted with H, Cl or (per)fluoroalkyl, having from 1 to 4 carbon atoms.

8. The process according to claim 7, wherein the compounds c) are the following with the perfluorooxyalkylene units statistically distributed along the chain:

a¹) $-(C_3F_6O)_{m'}(CFYO)_{n'}-$ wherein the units $(C_3F_6O)$ and (CFYO) are perfluorooxyalkylene units statistically distributed along the chain: m' and n' are integers to give the above mentioned molecular weights, and m'/n' is in the range 5 and 40, n' being different from 0; Y is F or $CF_3$; n' can also be 0;

b') —(C$_2$F$_4$O)$_{p'}$(CFYO)$_{q'}$—(C$_3$F$_6$O)$_{t'}$— wherein p' and q' are integers such that p'/q' ranges from 5 to 0.3, to give a molecular weight within the above indicated limits; t' is an integer with the meaning of m', Y=F or CF$_3$; t' is 0 and q'/(q'+p'+t') is equal to 1/10 or lower and the t'/p' ratio ranges from 0.2 to 6;

C') —CR$_4$R$_5$CF$_2$CF$_2$O— wherein R$^4$ and R$^5$ are equal to or different from each other and selected from H, Cl; the molecular weight such to be within the above limits, and a fluorine atom of the perfluoromethylene unit optionally substituted with H, Cl or (per)fluoroalkyl, having from 1 to 4 carbon atoms; the end groups of the bifunctional (per)fluoropolyethers c), said end groups being equal to or different from each other, are HO(CH$_2$CH$_2$O)$_{x0}$CH$_2$— wherein x0 is an integer in the range 0–4.

9. The process according to claim 1, wherein the heterofunctional monomers indicated in d) have the same formula (1A) of the component b), wherein R'$_{1A}$, R"$_{1A}$ and n1A are as above defined and T is selected from the groups that in component d) are at the place of the Y$_0$ function, the OH group of the formula 1A is optionally substituted with a SH group.

10. The process according to claim 1, wherein the component e) is formed by monofunctional hydroxyl or carboxylic (per)fluoropolyethers (e$^o$), comprising one or more of the (per)fluorooxyalkylene units above indicated for the PEPE diol component c).

11. The process according to claim 10, wherein the (e$^o$) compounds are the following ones, wherein the following units are statistically distributed along the chain:

IB) A'O(C$_3$F$_6$O)$_m$(CFYO)$_n$— wherein Y is —F, —CF$_3$; A'=—CF$_3$, —C$_2$F$_5$, —C$_3$F$_7$, —CF$_2$Cl, C$_2$F$_4$Cl; the C$_3$F$_6$O and CFYO units are randomly distributed along the (per)fluoropolyether chain, m and n are integers, the mm ratio is ≧2;

IIB) C$_3$F$_7$O(C$_3$F$_6$O)$_m$— wherein m is a positive integer, wherein the number average molecular weight is the one above indicated;

IIIB) (C$_3$F$_6$O)$_m$(C$_2$F$_4$O)$_n$(CFYO)$_q$— wherein Y is equal to —F, —CF$_3$; m, n and q, different from zero, are integers such that the number average molecular weight is that indicated for the component e), the reactive monofunctional end group is T$_b$(CH$_2$CH$_2$O)$_{x0}$CH$_2$— wherein x0 is an integer between 0 and 4, T$_b$ is OH; when the component e$_o$ is a monofunctional carboxylic (per)fluoropolyether, the monofunctional end group is

—CF$_2$—COOH.

12. The process according to claim 1, wherein component e) is formed by monofunctional hydroxyl (per)fluoroalkanes (e') having the formula:

(R$_{fl}$)$_{pl}$Q—OH  (e')

wherein:

R$_{fl}$ is a C$_3$–C$_{30}$ fluoroalkyl radical;

pl is 1 or 2;

Q is a bivalent C$_1$–C$_{12}$ aliphatic or C$_6$–C$_{12}$ aromatic linking bridge; Q optionally contains heteroatoms such as N, O, S, or carbonylimino, sulphonylimino or carbonyl groups; Q is non-substituted or it is linked to substituents selected from the following:

halogen atoms, hydroxyl groups, C$_1$–C$_6$ alkyl radicals.

13. The process according to claim 1, wherein the oligourethanes have number average molecular weight in the range 2,000–9000, determined by vapour pressure osmometry VPO.

14. The process according to claim 1, wherein the compositions are under the form of monocomponent aqueous dispersions having a dry content in the range 1–70%.

15. The process according to claim 14, wherein the oligourethanes in aqueous dispersion are formulated in mixture with fluoropolymers.

16. The process according to claim 15, wherein the amount of fluoropolymers ranges from 0 to 30%.

17. The process according to claim 15, wherein concentrated latexes of TFE copolymers are admixed with the oligourethane aqueous dispersions.

18. The process according to claim 17, wherein the latexes of TFE fluoropolymers are formed by homopolymers of tetrafluoroethylene or its copolymers with one or more monomers containing at least one ethylenic unsaturation.

19. The process according to claim 17, wherein the average sizes of the fluoropolymer particles range from 20 to 400 nm.

20. The process according to claim 15, wherein the fluoropolymers added to the oligourethane dispersions are (per)fluoropolyethers having (per)fluorinated end groups and kinematic viscosity at 20° C. in the range 30–300 Centistokes (3–300×10$^7$ m$^2$/s) according to ASTM D 445.

21. The process according to claim 1, wherein additives such as catalysts, crosslinking co-catalysts, ionic and non ionic, also fluorinated, surfactants, photostabilizing additives, fillers and pigments, thixotropic agents, dispersants, for pigments and fillers; extending, anticissing, antifoam additives are added to the aqueous formulation.

22. The process according to claim 1, wherein polyurethanes are crosslinked.

23. The process according to claim 22, wherein the coating thickness is in the range 0.1–5 microns.

24. The process according to claim 22, wherein the support is in a hydrogenated polymeric material selected from the group consisting of rubber and plastic, optionally subjected to plasma or crown treatment to generate on the surface of the polymeric material reactive polar sites.

25. Aqueous formulations according to claim 15.

26. Manufactured articles obtainable from the formulations of claim 25.

27. The process according to claim 1, wherein the blocking agents of the NCO group are selected from the group consisting of ketoximes, phenols, mono- and di-alkyl substituted phenols wherein the alkyl chain contains from 1 to 8 carbon atoms, pyrazol, caprolactam, ethylmalonate, acetylacetone, and ethylacetoacetate.

28. The process according to claim 12, wherein Q is selected from the group consisting of the following divalent radicals: —CH$_2$—, —C$_2$H$_4$—, SO$_2$N(R$^5$)C$_2$H$_4$—, —SO$_2$N(R$^5$)CH$_2$CH(CH$_3$)—, —C$_2$H$_4$SO$_2$N(R$^5$)C$_4$H$_8$—, R$^5$ being H or a C$_1$–C$_4$ alkyl.

* * * * *